(12) United States Patent
Fan et al.

(10) Patent No.: US 9,853,448 B2
(45) Date of Patent: Dec. 26, 2017

(54) SYSTEMS AND METHODS FOR COORDINATING ELECTRICAL NETWORK OPTIMIZATION

(75) Inventors: Hua Fan, Norcross, GA (US); Jiyuan Fan, Duluth, GA (US); Paul Backscheider, Mosman (AU); John Douglas McDonald, Duluth, GA (US)

(73) Assignee: General Electric Company, Schenectady, NY (US)

( * ) Notice: Subject to any disclaimer, the term of this patent is extended or adjusted under 35 U.S.C. 154(b) by 1635 days.

(21) Appl. No.: 13/352,227

(22) Filed: Jan. 17, 2012

(65) Prior Publication Data

US 2013/0184889 A1     Jul. 18, 2013

(51) Int. Cl.
*G05B 15/02*     (2006.01)
*H02J 3/00*     (2006.01)
(Continued)

(52) U.S. Cl.
CPC .............. *H02J 3/00* (2013.01); *G06Q 10/06* (2013.01); *G06Q 50/06* (2013.01); *H02J 3/14* (2013.01); *H02J 13/0006* (2013.01); *H02J 3/18* (2013.01); *H02J 13/0062* (2013.01); *H02J 13/0075* (2013.01); *Y02B 70/3225* (2013.01); *Y02E 40/30* (2013.01); *Y02E 40/74* (2013.01); *Y04S 10/22* (2013.01); *Y04S 20/222* (2013.01)

(58) Field of Classification Search
CPC ............ H02J 3/18; H02J 13/0075; H02J 3/14
USPC ........................................................ 700/292
See application file for complete search history.

(56) References Cited

U.S. PATENT DOCUMENTS 6,317,953 B1 * 11/2001 Pryor .................. A01B 69/008
                                                           29/407.01
6,614,880 B1 * 9/2003 Lysaght ................ H04M 3/305
                                                           379/1.01
(Continued)

FOREIGN PATENT DOCUMENTS

WO    WO 2005064279 A1 *   7/2005 ............. G01D 3/022
WO    WO 2007087537 A2 *   8/2007 ........... G06N 99/005

OTHER PUBLICATIONS

Fan, Hua, et al.; "Collaborative Optimization of Distribution Grid Operation," IEEE, pp. 1-6 (Jan. 18, 2012).
(Continued)

*Primary Examiner* — Darrin Dunn
(74) *Attorney, Agent, or Firm* — Stephen J. Terrell; Parks IP Law LLC (57) ABSTRACT

In one embodiment, a system includes a coordinated distribution optimization (CDO) system. The CDO system includes a processor configured to coordinate execution of a plurality of independent electrical network applications. Each of the plurality of independent electrical network applications is configured to alter one or more operational parameters of a power grid based on one or more respective objectives and based on power grid operational data, and the execution of the plurality of independent electrical network applications is coordinated by the CDO system to block the power grid from entering an abnormal state. The CDO system further comprises a network interface configured to receive the power grid operational data from a controller of the power grid, and wherein the power grid operational data comprises current values for the one or more operational parameters of the power grid.

20 Claims, 3 Drawing Sheets

(51) Int. Cl.
  *H02J 3/14* (2006.01)
  *H02J 13/00* (2006.01)
  *G06Q 10/06* (2012.01)
  *G06Q 50/06* (2012.01)
  *H02J 3/18* (2006.01)

(56) References Cited

U.S. PATENT DOCUMENTS

| | | | | |
|---|---|---|---|---|
| 7,062,831 | B2* | 6/2006 | Walt, II | B23P 19/066 29/407.02 |
| 7,698,010 | B2* | 4/2010 | Cannedy | G05B 19/406 382/152 |
| 8,260,452 | B2* | 9/2012 | Austin | G05B 19/41805 700/168 |
| 8,401,709 | B2* | 3/2013 | Cherian | H02J 3/00 700/291 |
| 8,738,180 | B2* | 5/2014 | Shi | B25J 5/02 700/245 |
| 9,535,418 | B2* | 1/2017 | Rataul | G05B 19/41805 |
| 2004/0158772 | A1* | 8/2004 | Pan et al. | 714/14 |
| 2006/0156157 | A1* | 7/2006 | Haselden | G06F 11/0793 714/746 |
| 2007/0219755 | A1* | 9/2007 | Williams | H02J 3/32 702/188 |
| 2009/0198464 | A1* | 8/2009 | Clarke | G05B 19/41875 702/82 |
| 2009/0281674 | A1* | 11/2009 | Taft | 700/286 |
| 2011/0023280 | A1* | 2/2011 | Renke | B25B 23/14 29/407.02 |
| 2011/0062708 | A1* | 3/2011 | Prochaska | F02D 29/06 290/7 |
| 2011/0106321 | A1* | 5/2011 | Cherian | H02J 3/00 700/286 |
| 2011/0282508 | A1* | 11/2011 | Goutard | H04L 63/20 700/293 |
| 2012/0029720 | A1* | 2/2012 | Cherian | H02J 13/00 700/297 |
| 2012/0104850 | A1* | 5/2012 | Fallis | H02J 13/0075 307/31 |
| 2012/0265360 | A1* | 10/2012 | Smit | G05F 1/66 700/293 |
| 2012/0317550 | A1* | 12/2012 | Lindahl | G06F 11/3656 717/128 |
| 2014/0129025 | A1* | 5/2014 | Freeman | G06Q 10/08 700/186 |

OTHER PUBLICATIONS

Fan, Hua, et al.; "Collaborative Optimization of Distribution Grid Operation," Improving the Grid Reliability and Efficiency; Innovative Smart Grid Technologies, Presentation; IEEE PES, pp. 1-26 (Jan. 18, 2012).

* cited by examiner

SYSTEMS AND METHODS FOR COORDINATING ELECTRICAL NETWORK OPTIMIZATION

BACKGROUND OF THE INVENTION

The subject matter disclosed herein relates to electrical networks, and more specifically, to managing and optimizing electrical networks.

An electrical network (e.g., a power grid) may include a number of electrical components (e.g., power sources, transmission or distribution lines, transformers, capacitors, switches, and similar components) that may work together to produce, convert, and transmit electrical power throughout the electrical network. Many modern electrical networks are electronically managed by at least one controller (e.g., an industrial control system (ICS), a supervisory control and data acquisition (SCADA) system, or similar controller or control system). The controller may generally receive information regarding the state of the electrical network via sensors or "smart" electrical components (e.g., power sources, transformers, capacitors, or similar electrical components) having built-in sensors distributed throughout the network. Moreover, the controller may send instructions (e.g., control signals) to certain electrical components to alter the behavior of the electrical network based on the received information such that certain objectives may be accomplished. For example, a controller may determine (e.g., based on information from one or more sensors or components in the electrical network) that a power source in a feeder of an electrical network is not providing sufficient power to meet demand. Accordingly, the controller may send control signals to the power source to instruct the power source to provide sufficient power such that the demand may be met. Unfortunately, existing systems lack a means for managing and prioritizing multiple objectives that may, at times, be in conflict with one another.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a processor configured to coordinate execution of a plurality of electrical network applications, wherein each of the plurality of electrical network applications is configured to alter one or more operational parameters of an electrical network based on one or more respective objectives and based on operational data received from the electrical network, and wherein the execution of the plurality of electrical network applications is coordinated to block the electrical network from entering an abnormal state.

In another embodiment, a method includes executing a first optimization application, via at least one processor, to determine a first set of adjustments corresponding to one or more operational parameters of an electrical network. The method also includes determining whether the first set of adjustments is valid based on one or more operational conditions of the electrical network and re-executing the first optimization application when the first set of adjustments is determined not to be valid. The method further includes executing a second optimization application, via the at least one processor, to determine a second set of adjustments corresponding to the one or more parameters of the electrical network when the first set of adjustments is determined to be valid.

In another embodiment, an article of manufacture includes one or more tangible, non-transitory, computer-readable media at least collectively storing instructions executable by a processor of an electronic device. The instructions include instructions to execute a primary application to control a plurality of parameters of an electrical network, wherein the primary application comprises a fault detection, isolation, and service restoration (FDIR) application. The instructions include instructions to coordinate execution of a plurality of secondary applications, wherein each of the plurality of secondary applications determines a respective set of changes corresponding to the plurality of parameters of the electrical network. The plurality of secondary applications include a Volt/Volt-ampere reactive control (IVVC) application, an optimal feeder reconfiguration (OFR) application, a demand-response management (DRM) application, a distributed energy resources management (DERM) application, or any combination thereof. The instructions also include instructions to alter one or more of the plurality of parameters of the electrical network based, at least in part, on the sets of changes determined by the plurality of secondary applications.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth above, an electrical network may include a controller that may control the various parameters of the electrical network (e.g., a power grid). Such a controller may control how the components within an electrical network (e.g., power sources, switches, voltage regulators, capacitors, and/or similar components) operate when producing, transforming, and/or transmitting power throughout the electrical network. Additionally, the controller, or one or more processors communicatively coupled to the controller, may execute a number of applications that determine which parameters of the electrical network to alter in order to address certain situations in the electrical network (e.g., outages, inefficiencies, load imbalances, or similar situations). These applications each include a set of instructions defining a process for determining how to change the parameters of the electrical network (e.g., opening and/or closing of switches, adjusting voltage profiles, changing power outputs of power resources, or activating/deactivating capacitor banks) to alter the behavior of the electrical network to address such situations. That is, these applications may include instructions stored on non-transitory, tangible, machine-readable media (e.g., memory, optical storage, magnetic storage, or other suitable non-transitory media) that may be executed by one or more processors to accomplish certain corresponding objectives (e.g., address outages, address load imbalances, improve efficiency) within the electrical network.

For example, these electrical network applications may instruct the controller how to adjust the parameters of the electrical network to handle fault situations (e.g., a downed transmission line or a failed voltage regulator) within the electrical network. Furthermore, these applications may seek to adjust the parameters of the electrical network to optimize the electrical network in terms of minimizing power losses, minimizing power consumption, maximize energy efficiency, and/or improved load balancing, and the like. A non-limiting list of suitable electrical network application examples includes: a fault detection, isolation, and service restoration (FDIR) application; an integrated Volt/Volt-ampere reactive control (IVVC) application; an optimal feeder reconfiguration (OFR) application; a demand-response management (DRM) application; a distributed energy resources management (DERM) application; an automatic generation control (ControlGen) application; or a capacitor control application. Indeed, in certain systems, dozens of applications may be used to determine how to best manage the electrical network.

These various electrical network applications may, under certain circumstances, disagree about which parameters of the electrical network should be altered. That is, since each application has its own objectives and constraints and may be executed independently (e.g., by the same or another processor), two applications may respectively determine that one or more parameters of the electrical network need to be changed in different ways. Furthermore, if a controller is configured to allow each application to alter the parameters of the electrical network in turn, two or more applications may alter these parameters in conflicting ways (e.g., producing incompatible parameters). In such a situation, the values of the parameters may oscillate as each application undoes the changes made by the preceding application. This may lead to inefficiencies (e.g., power losses, additional cost, wasted resources, etc.) or worse (e.g., permanent abnormal states or equipment damage) within the electrical network.

Accordingly, the presently disclosed embodiments are directed toward coordinating the execution of multiple electrical network control and/or optimization applications. For example, the disclosed embodiments include a coordinated distribution optimization (CDO) method and system to enable the prioritized operation of each application so as to prevent conflict that may lead to inefficiencies and/or abnormal states within the electrical network. That is, the disclosed CDO method and system includes instructions stored on non-transitory, tangible, machine-readable media (e.g., memory, optical storage, magnetic storage, or other suitable non-transitory media) that may be executed by one or more processors to coordinate the operation of each of the electrical network applications. The presently disclosed CDO method and system is configured such that the various optimization objectives of the individual applications are properly prioritized and the corresponding constraints associated with each application are respected. By consolidating the various optimization objectives and constraints from the individual control and optimization applications the distribution system operation performance, overall efficiency, and reliability of the electrical network may be dramatically improved.

Figure 1:
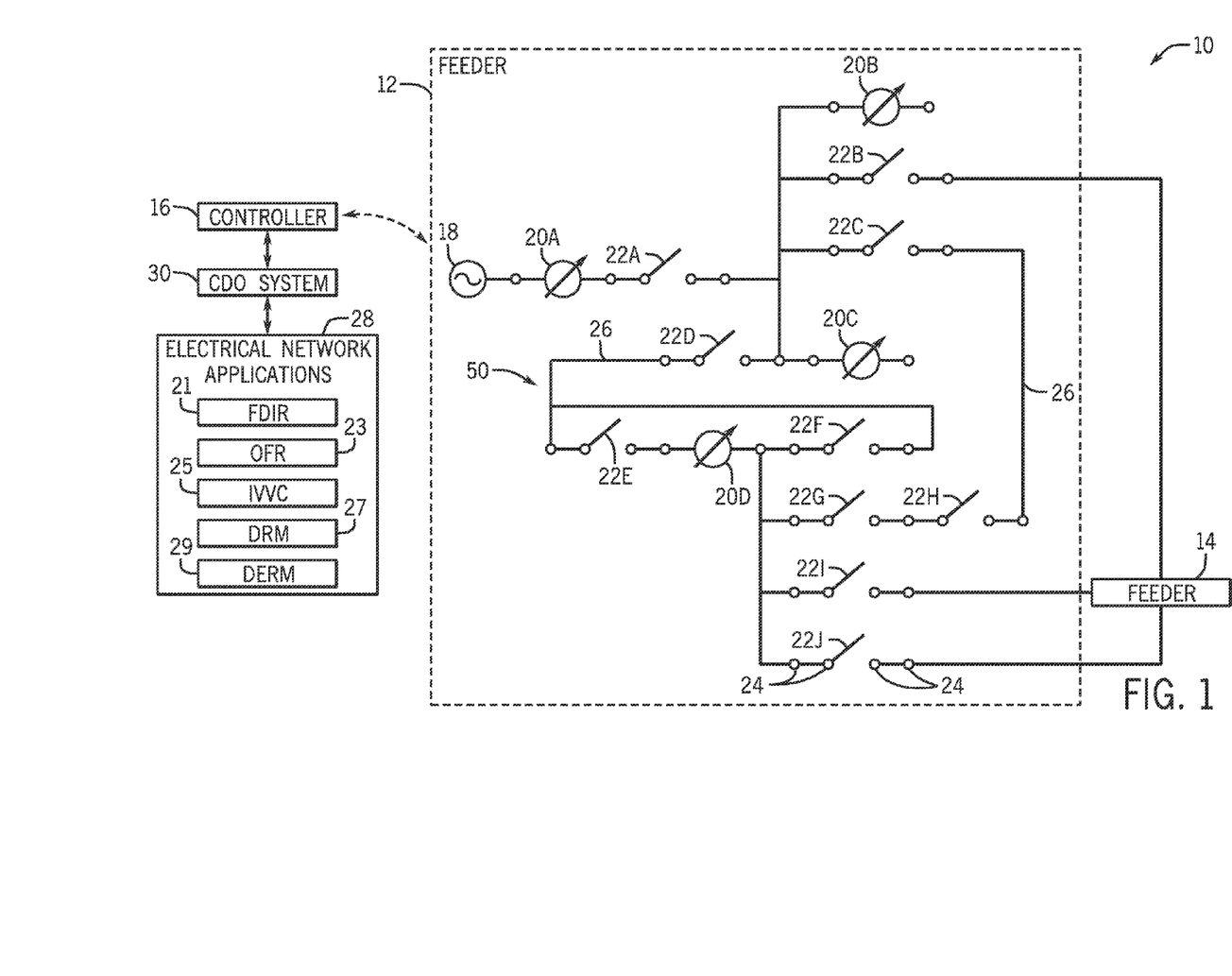
FIG. 1 is a schematic illustrating an embodiment of an electrical network having a number of parameters that may be managed by a controller and the collaborative operation of a plurality of electrical network control and/or optimization applications, in accordance with aspects of the present technique.

With the foregoing in mind, FIG. 1 is a schematic illustrating an embodiment of an electrical network 10. The illustrated electrical network 10 includes a first feeder 12 and a second feeder 14 that are both being managed by a controller 16. The feeder 12 includes a number of electrical components coupled to one another for the purposes of producing, transforming, and transmitting power throughout the electrical network 10. The illustrated feeder 12 includes a power supply 18, voltage regulators 20A-D, switches 22A-J, as well as a number of nodes 24 coupled to one another via a number of transmission lines 26. It should be appreciated that a number of the switches 22, specifically switches 22B, 22I and 22J, are tie switches that are capable of coupling various portions of the feeders 12 and 14. That is, by closing these tie switches 22B, 22I and/or 22J, the power source 18 may be used to supply power to portions of the feeder 14 and/or a power source of feeder 14 may be used to supply power to portions of the feeder 12.

In certain embodiments, the controller 16 may be communicatively coupled to each of the electrical components (e.g., power supply 18, voltage regulators 20A-D, switches 22A-J, etc.) of the electrical network 10. For example, the controller 16 may have a network connection (e.g., a wired or wireless network connection) that allows the controller 16 to communicate with the various electrical components of the network 10. Using this connection, the controller 16 receives information regarding the status and/or condition of each of the electrical components in the electrical network. For example, power source 18 may be communicatively coupled to controller 16 such that the controller 16 may receive information regarding the operational parameters of the power source 18. That is, the controller 16 may receive information regarding the present load, output, and/or voltage profile of the power source 18. By further example, the controller 16 may receive information regarding a switch (e.g., switch 22A), such as whether or not the switch is closed. In certain embodiments, the controller 16 may only be communicatively coupled to a portion of the electrical components (e.g., the "smart" electrical components) in the electrical network 10. Accordingly, by receiving operational information from at least a portion of the components of the electrical network, the controller 16 may generally monitor electrical network 10.

In addition to receiving information regarding the electrical components of the electrical network 10, the controller 16 also controls certain operational parameters of the electrical components. That is, the controller 16 may provide the electrical components of the electrical network 10 with instructions to adjust their state or behavior (e.g., voltage profile, power output, etc.). For example, the controller 16 they provide instructions to the power source 18 to instruct power source to increase power production. By further example, the controller 16 may provide instructions to a switch (e.g., switch 22B) to have the switch change state from open to closed, or vice versa. As such, by sending instructions to the components of the electrical network, the controller 16 may generally control the behavior of the electrical network 10.

The controller 14 may adjust the operational parameters of the electrical network 10 based on a number of different objectives. That is, the controller 14 may adjust the parameters of the electrical network 10 based on the recommendations of a number of applications 28 (e.g., FDIR 21, IVVC 23, OFR 25, DRM 27, and/or DERM 29 applications). It should also be appreciated that, in certain embodiments, these electrical network applications 28 may directly change (e.g., via the controller 16) the parameters of the electrical network 10, while, in other embodiments, the applications may make recommendations to a user to manually alter the parameters of the electrical network 10. In certain embodiments, these applications 28 may be executed by a single processor, while, in other embodiments, each of these applications 28 may be executed by a separate processor.

Regardless, the execution of each of these electrical network applications 28 may generally be managed by a coordinated distribution optimization (CDO) system 30, in accordance with aspects of the disclosed embodiments. That is, as discussed in detail below, the CDO system 30 may ensure that the changes to the parameters of the electrical network 10 recommended by the various applications 28 are properly coordinated based upon a priority-based control scheme. In certain embodiments, the CDO system 30 may be executed by the same processor as one or more of the electrical network applications 28. Indeed, in certain embodiments, the CDO system 30 may be integrated with various electrical network applications (e.g., FDIR 21, IVVC 23, OFR 25, DRM 27, and/or DERM 29 applications) such that various electrical network applications 28 and the CDO process (described below with respect to FIG. 3) may be executed by a single electronic device or processor. In certain embodiments, the CDO system 30 and the applications 28 may be executed on the same processor. Furthermore, in certain embodiments, the applications 28 (e.g., the one or more processors executing applications 28) may be communicatively coupled to the controller 16 such that the applications 28 may be aware of the current operational parameters of the electrical network 10. In other embodiments, the CDO system 30 may ensure that the applications 28 receive sufficient information regarding the operational parameters of the electrical network 10 to properly assess electrical network 10 and recommend parameter adjustments.

Figure 2:
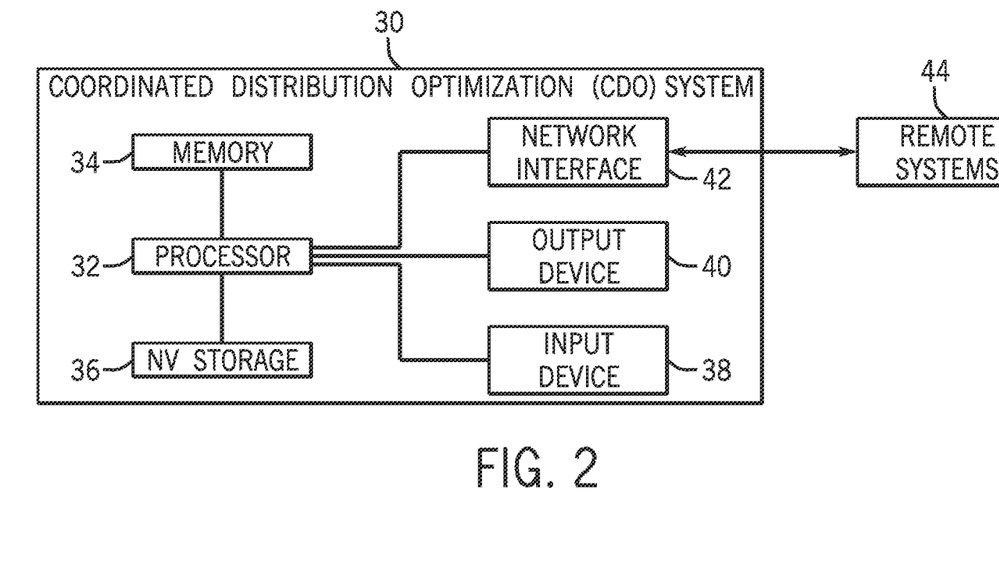
FIG. 2 is a schematic illustrating an embodiment of a coordinated distribution optimization (CDO) system for coordinating the execution of a plurality of electrical network control and/or optimization applications.

FIG. 2 illustrates an embodiment of a coordinated distribution optimization (CDO) system 30 for managing the execution of a number of electrical network control and/or optimization applications 28, in accordance with aspects of the disclosed embodiments. More specifically, FIG. 2 illustrates a number of internal components for the embodiment of the CDO system 30. The illustrated CDO system 30 includes a processor 32 that generally controls the operation of the system 30 through the execution of instructions stored in memory 34 (e.g., random access memory (RAM)) and/or non-volatile (NV) storage 36 (e.g., a hard drive or solid-state disk). That is, the processor 32 may execute a number of instructions stored in the memory (e.g., memory 34 and/or NV storage 36) such that the CDO system 30 may control the order in which the applications 28 are executed, set conditions to be met before each of the applications 28 is executed, and effectively prioritize parameter adjustments recommended by certain applications 28 over the recommendations of other applications. As mentioned, in certain embodiments, the processor 32 may also work in conjunction with the memory 34 and/or NV storage 36 to execute the various electrical network applications 28 on the CDO system 30. Furthermore, the illustrated CDO system 30 includes one or more input devices 38 (e.g., a keyboard, mouse, touchpad, touchscreen, or similar input device) to allow a user to interface with the CDO system, for example, to configure the operation of the system. Additionally, the illustrated CDO system 30 also includes one or more output devices 40 (e.g., a monitor, liquid crystal display (LCD), projector, printer, or similar output device) to allow a user to receive information regarding the operation of the CDO system 30.

The illustrated CDO system 30 further includes at least one network interface 42 that enables the CDO system 30 to communicate with one or more remote systems 44. In certain embodiments, the network interface may include any wired interface (e.g., Ethernet, Fieldbus Foundation I/O Net or high-speed Ethernet (HSE), or similar wired interface) or any wireless interface (e.g., 802.xx, Zigbee, near-field communication (NFC), cellular data, or similar wireless interface) capable of receiving data from, and sending data to, the remote systems 44. For example, the network interface 42 may be configured to communicatively couple with the controller 16 such that the CDO system 30 may send to the controller 16 instructions to alter parameters of the electrical network 10 based on the coordinated execution of the applications 28. By further example, in embodiments where the applications 28 are each executed by a separate processor, the network interface 42 may be configured to communicatively couple the CDO system 10 to these processors such that the CDO system 10 may control and coordinate the execution of each of these applications 28.

In certain embodiments, the CDO system 30 may generally separate the electrical network applications 28 into two broad categories: primary or control applications, and secondary or optimization applications. While the terms "control" and "optimization" may generally be used herein to describe these applications, it should be appreciated that, regardless of the term used, an application may, in certain embodiments may, at times, control and/or optimize the electrical network. Generally speaking, the primary control application may be responsible for ensuring that the electrical network 10 remains operational, while the secondary optimization applications may be responsible for improving the performance of the electrical network 10. The control application may, therefore, be a real-time application designed to deal with operational emergencies (e.g., faults) within the electrical network 10 to ensure that service is maintained to most or all customers. In contrast, each of the optimization applications may seek to maximize or minimize a particular parameter of the electrical network 10 (i.e., optimize the electrical network 10) based upon one or more specific objectives. That is, one secondary optimization application may seek to minimize power losses within a feeder, while another secondary optimization application may seek to maximize energy efficiency. It should be appreciated that, while the disclosed embodiments may be described in the context of specific electrical network control and/or optimization applications 28 (e.g., the FDIR, IVVC, OFR, DRM, and DERM applications), in other embodiments similar applications or applications serving various roles may additionally or alternatively be utilized with the CDO system 30.

One example of a primary or control application is the fault detection, isolation, and service restoration (FDIR) application. The FDIR application may generally control the operation of switches (e.g., switches 20A-J) within the electrical network 10 in order to control the routing of power between the power source 18 and other portions of the feeders 12 and 14. In particular, the FDIR application may control the operation (i.e., open or close) of tie switches 20B, 20I, and 20J such that portions of feeder 12 may be powered by feeder 14, or vice versa, in the event of a fault situation (e.g., a downed transmission line 26, a failed voltage regulator 20, or similar fault). Furthermore, the FDIR application may consider a number of objectives during execution. For example, in certain embodiments, the FDIR are application may have objectives including: fast service restoration, maximizing the number of customers restored after a fault situations, minimizing the number of switch operations, minimizing the effects of a fault on the non-faulted portions of the electrical network, and/or minimizing the number of operations to restore the electrical network 10 to a pre-fault state. Moreover, each of these objectives may correspond to one or more instructions stored on a tangible, non-transitory, computer readable medium to be executed by one or more processors.

One example of an electrical network optimization application is the optimal feeder reconfiguration (OFR) application. The OFR may generally recommend that various switches (e.g., any of switches 22A-J) within the electrical network be opened or closed in order to achieve optimal load balancing between the feeders 12 and 14. The OFR application may consider a number of objectives during execution. For example, in certain embodiments, the OFR application may have objectives including: minimizing feeder power loss, optimizing feeder load balancing, optimizing feeder phase load balancing, and/or enhancing feeder voltage profiles. Moreover, each of these objectives may correspond to one or more instructions stored on a tangible, non-transitory, computer readable medium to be executed by one or more processors. Furthermore, in certain embodiments, the OFR application may be executed on a relatively long look-ahead horizon (i.e., how far into the future events within the electrical network 10 are predicted/planned by an electrical network application) and/or on a system basis across multiple feeders (e.g., feeders 12 and 14) and, as such, may be used to provide foundational electrical network optimization. Accordingly, in certain embodiments, the OFR application may be assigned a top priority amongst the other secondary electrical network optimization applications. Furthermore, in certain implementations, the OFR application may incorporate (e.g., via subroutines) the optimization functions of other electrical network optimization applications (e.g., the IVVC and/or DR applications discussed below) in order to account for the interactive impacts of the respective functions to the execution of the OFR application.

Another example of an electrical network optimization application is the integrated Volt/Volt-ampere reactive control (IVVC) application. The IVVC application may generally recommend changes to the parameters of the electrical network in order to maintain valid voltage ranges for the desired voltage profiles throughout the electrical network. In particular, the IVVC application may control the operation of capacitor banks within the electrical network 10 as well as adjust the tap position of voltage regulators 20A-D and the power source 18. Furthermore, the IVVC application may consider a number of objectives during execution. For example, in certain embodiments, the IVVC are application may have objectives including: minimizing power losses, maximizing feeder power factor, minimizing feeder power consumption, providing a flat feeder voltage profile (e.g., for low, middle, and high voltages in a three-phase power system), and/or maximizing the total benefit to the power provider and customers. Moreover, each of these objectives may correspond to one or more instructions stored on a tangible, non-transitory, computer readable medium to be executed by one or more processors.

Another example of an electrical network optimization application is the demand-response management (DRM) application. The DRM application may generally recommend changes to the parameters of the electrical network in order to accommodate variations in power costs and demand. For example, the DRM application may direct load control to the facilities of the power consumers and/or provide distributed energy resource (DER) control at the consumer level. That is, the DRM may provide "smart" meters and/or appliances at a customer's home instructions or advice for when to consume power. By specific example, under certain circumstances, the DRM application may recommend that a critical peak pricing (CPP) event be issued (e.g., to one or more "smart" meters and/or appliances coupled to the electrical network) to inform the components within the electrical network 10 that power has reached a relative maximum price for the day, resulting in various "smart" meters and/or appliances delaying or reducing consumption of power until the CPP event has passed. Accordingly, by issuing the CPP event, the DRM application may effectively reduce the peak load of the electrical network 10. Furthermore, the DER application may consider a number of objectives during execution. For example, in certain embodiments, the DRM application may include objectives such as reducing peak load demand, relaxing delivery congestion, and/or balancing feeder phase load. Moreover, each of these objectives may correspond to one or more instructions stored on a tangible, non-transitory, computer readable medium to be executed by one or more processors.

Yet another example of an electrical network optimization application is the distributed energy resources management (DERM) application. The DERM application may generally recommend changes to the parameters of the electrical network in order to efficiently manage various distributed energy resources (DER) present within the electrical network 10. That is, the DERM application may generally utilize power producing components beyond the power source 18 in order to meet demand and limit the distance that power may be transmitted before consumption. For example, the DERM application may recommend when certain DER (e.g., a solar panel, electric vehicle charging station, or similar distributed energy resources) is to supply power to the electrical network 10. By further example, the DERM application may provide instructions to "smart" appliances (e.g., certain refrigerators, water heaters, air conditioning units) to control when they are preferentially to consume power within the electrical network 10. Furthermore, in certain embodiments, the DERM application may consider a number of objectives during execution, including: maximizing energy efficiency, reducing peak demand from the main electrical grid, reducing feeder loss, improving feeder voltage and PF profiles. Moreover, each of these objectives may correspond to one or more instructions stored on a tangible, non-transitory, computer readable medium to be executed by one or more processors.

As mentioned above, the disclosed coordinated distribution optimization (CDO) method and system enables the plurality of the electrical network applications 28 to collaboratively optimize the operation of the electrical network 10. That is, in the absence of such a coordinated management system, each of the plurality of electrical network control and optimization application 28 may execute independently, with each application making or recommending changes to the parameters of the electrical network 10 without being aware of the changes being made or recommended by the other applications. As such, in an electrical network 10 lacking the presently disclosed CDO method and system (i.e., lacking CDO system 30), circumstances may arise in which two or more of these applications may come into conflict, which may result in inefficiencies and/or abnormal states within the electrical network 10. However, as discussed below, the presently disclosed CDO method and system helps to block and/or resolve conflict between the applications. That is, as discussed below, the CDO system 30 may prioritize the execution of these electrical network applications 28 in series according to a hierarchy that is based on the priority of the objectives of the each application. Furthermore, the CDO system 30 may ensure that the results of the execution of each higher priority electrical network applications 28 are valid with respect to the current state of the electrical network before executing the next electrical network application.

Figure 3:
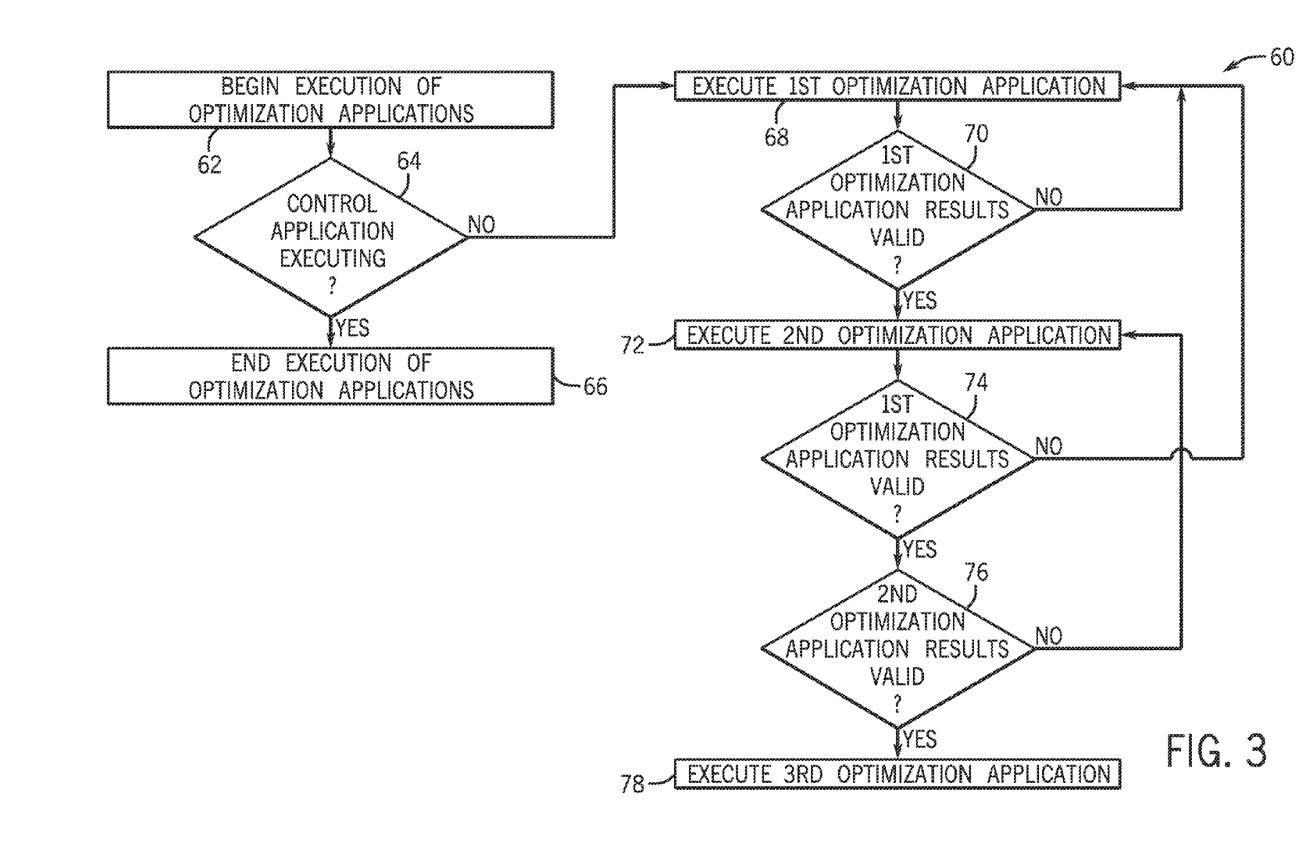
FIG. 3 is a process flow diagram illustrating an embodiment of a process for coordinating the execution of one primary and three secondary electrical network control and/or optimization applications.

FIG. 3 illustrates an embodiment of a process 60 that the CDO system 30 may utilize to coordinate the execution of a number of electrical network control and/or optimization applications 28. That is, FIG. 3 illustrates a computer-implemented process 60 which may include a plurality of instructions stored on one or more computer readable media and configured to be executed by one or more processors to carry out functions. More specifically, the process 60 illustrated in FIG. 3 pertains to an example CDO system 30 configured to coordinate the execution of one (primary) electrical network control application and three (secondary) electrical network optimization applications. It should be noted that the relative priority of each of the electrical network optimization applications may be determined, for example, by a user of the CDO system 30 based on the objective of each optimization application. Accordingly, in other embodiments, the relative priority of the illustrated electrical network optimization applications may be different.

The illustrated process 60 starts by beginning (block 62) the execution of the secondary electrical network optimization applications. However, prior to actually executing any of these optimization applications, the CDO system 30 first checks to determine if (block 64) the control application is currently executing. If the CDO system 30 determines that the electrical network control application (e.g., FDIR) is currently executing, then the CDO system 30 may end (block 66) or temporarily suspend the execution of the optimization applications. That is, since the electrical network control application (e.g., FDIR) is generally manages the critical aspects (e.g., emergency situations) of the electrical network 10, the process 60 may prioritize the execution of this control application above any of the optimization applications. Furthermore, in certain embodiments, the CDO system 30 may be configured such that the control application may, furthermore, interrupt the execution of an optimization application, for example, to deal with an emergency fault situation.

When, however, the CDO system 30 determines that the control application (e.g., FDIR) is not executing, the CDO system 30 may execute (block 68) the highest priority optimization application. It should be appreciated that, in embodiments where the optimization applications are executed on a different processor than the CDO system 30, the CDO system 30 may provide instructions (e.g., via network interface 42) for that processor to begin execution of the specified optimization application. In certain embodiments, the highest priority optimization application may be the OFR application. In certain embodiments, after completing execution of an optimization application (e.g., in blocks 68, 72, and 78), a recommended set of changes to the parameters of the electrical network 10 may be provided to a user to be adjusted manually within the electrical network 10 (e.g., via controller 16). In other embodiments, the changes may be immediately delivered to the controller 16 to be automatically applied to the electrical network 10. Furthermore, in certain embodiments, the CDO system 30 may collect and combine the electrical network parameter changes recommended by each of the optimization applications (e.g., in blocks 68, 72, and 78) before a combined set of changes is provided to the controller 16 to be applied the electrical network 10.

After the execution of the first (i.e., highest priority) optimization application is completed, the CDO system 30 may then turn to the second (i.e., second highest priority) optimization application. In certain embodiments, the next highest priority optimization application may be the IVVC application. However, the CDO system 30 may first verify (block 70) that the results of the execution of the first (i.e., highest priority) optimization application (e.g., OFR) are valid before beginning execution of the second optimization application. For example, a multi-interval look-ahead horizon may be compared against the current electrical network conditions to ensure consistency. In other words, the effects of the electrical network changes determined during the execution of the first optimization application (block 68) may be compared to the current conditions of the electrical network 10 (e.g., over different time intervals and/or look-ahead horizons) to ensure consistency with the real time condition of the electrical network 10. If (block 70) any inconsistencies are found, the CDO system 30 may re-execute (block 68) the first (i.e., highest priority) electrical network optimization application. If, however, this CDO system 30 determine that no inconsistencies are present, then the CDO system 30 executes (block 72), or instructs another processor to execute, the second (i.e., second highest priority) electrical network optimization application. Furthermore, in certain embodiments, the changes to the parameters of the electrical network 10 recommended by the preceding application (e.g., OFR) may not be applied to the electrical network 10 until after the verification of the results (block 70) is completed.

After the execution (block 72) of the second (i.e., second highest priority) optimization application has been completed, the CDO system 30 may then turn to the third (i.e., third highest priority) electrical network optimization application. In certain embodiments, the third optimization application may be a DRM application. However, as with the execution of the second optimization application, the CDO system 30 may first validate (blocks 74 and 76) the results of the execution of the higher priority optimization applications (i.e., from blocks 68 and 72) against the current conditions of the electrical network 10 to ensure consistency. In other words, the effects of the electrical network changes determined during the execution of the first two optimization application (block 68 and 72) may be compared to the current conditions of the electrical network 10 (e.g., over different time intervals and/or look-ahead horizons) to ensure consistency with the real-time condition of the electrical network 10. If (block 74) any inconsistencies are found in the results of the first optimization application, then the first optimization application may be re-executed (block 68). Similarly, if (block 76) any inconsistencies are found in the results of the second optimization application, then the second optimization application may be re-executed (block 72). Furthermore, in certain embodiments, the changes to the parameters of the electrical network 10 recommended by the preceding applications (e.g., OFR and IVVC) may not be applied to the electrical network 10 until after the verification of the results (e.g., block 74 and 76) is completed.

If, however, the results from the first and second secondary optimization applications are determined to be valid (e.g., blocks 74 and 76), then the CDO system 30 may execute (block 78), or instruct another processor to execute, the third (i.e., third highest priority) optimization application. It should be appreciated that while the process 60 includes three optimization applications (e.g., OFR, IVVC, and DRM), 5, 10, 20, or any suitable number of electrical network optimization applications may be coordinated using the general technique described by process 60.

One example of conflict between the electrical network applications 28 in a system lacking the presently disclosed CDO system 30 may occur during the uncoordinated execution of a primary control application (e.g., FDIR) and two secondary optimization applications (e.g., IVVC and OFR). For example, turning to FIG. 1, during the operation of the electrical network 10, a fault 50 (e.g., a downed transmission line 26) may occur within the feeder 12. In this example, the primary control application (e.g., FDIR) may be executing in fully automatic mode, enabling the primary control application to automatically detect and isolate the fault in order to restore service to the greatest portion of the feeder 12 possible. Furthermore, the IVVC optimization application may be configured to optimize the power factor of the feeder 12 to 0.98, while the OFR optimization application may be configured to balance the load among the feeders 12 and 14. Additionally, in this example, prior to the occurrence of the fault 50, switches 22B, 22C, 22F, 22H, 22I, and 22J may be open, and switches 22A, 22D, 22E, and 22G may be closed. After the fault 50 has occurred, the feeder breaker trips and the feeder 12 may initially be fully deenergized. In response, the primary control application may detect a faulted segment and isolate the fault by opening the switches 22D and 22E, restore service upstream by closing the feeder breaker, and restore service downstream from the fault by closing the switch 22H. Meanwhile, while the control application (e.g., FDIR) is executing, the secondary optimization applications (e.g., OFR and IVVC) may also be executing completely unaware of the emergency situation. Accordingly, the OFR may recommend opening the switches 22H and 22A while closing switches 22B and switches 22I and/or 22J in order to rebalance the load between feeders 12 and 14. Furthermore, the IVVC application may enable various capacitor banks within the feeder 12 and adjust the tap settings on voltage regulators 20A and 20C to improve the power factor and voltage profile. Consequently, once the root cause of the fault 50 has been addressed, the primary control application may be unable to restore electrical network 10 back to its pre-fault configuration. That is, the control application (e.g., FDIR) may be unable to reverse the switching steps because the optimization applications (e.g., IVVC and OFR) were executing their optimization processes during the same time as when the primary control application was performing the service restoration. As such, since the secondary optimization applications remained unaware throughout the loss and restoration of service, they are generally unable to reverse their corresponding operations for the sake of the primary control application and, as a result, the electrical network 10 may remain in a permanent abnormal state.

In contrast, for a system incorporating the presently disclosed CDO system 30, the aforementioned permanent abnormal state described in the sample of conflict that forth above may be completely avoided. That is, by preventing the secondary optimization applications from executing while the primary control application is executing (e.g., as described in block 64), the presently disclosed CDO system 30 may prevent the secondary optimization applications (e.g., OFR and IVVC) from altering the parameters of the electrical network while the primary control application is executing. Accordingly, the CDO system 30 may allow for temporary inefficiencies to be present in the electrical network 10 when the primary control application is handling critical events (e.g., faults) in order to avoid a permanent abnormal state. Furthermore, since the secondary optimization applications do not alter parameters of the electrical network while the primary control application is executing, restoring the electrical network to its pre-fault state is significantly simplified.

A second example of conflict between electrical network applications 28 in a system lacking the presently disclosed CDO system 30 may occur during the uncoordinated execution of two optimization applications (e.g., IVVC and OFR). For example, turning again to FIG. 1, during the operation of the electrical network 10, two optimization applications (e.g., IVVC and OFR) may be executed in an uncoordinated fashion. Additionally, switches 22B, 22C, 22F, 22H, 22I, and 22J may initially be open, and switches 22A, 22D, 22E, and 22G may initially be closed. In this example, one optimization application (e.g., OFR) may be configured to balance the load among the feeders 12 and 14. Furthermore, the other optimization application (e.g., IVVC) may be configured to optimize the real power of feeder 12 to a certain value (e.g., 3500 kW). Accordingly, the OFR may close the switch 22J in order to balance the load between theaters 12 and 14, and may further suggest future switching operations to continue to balance the load for a certain period of time (e.g., a week). Additionally, the IVVC application, unaware of the future switching operations of the OFR application, may adjust voltage regulators 20A and 20D in order to achieve the specified real power value (e.g., 3500 kW). Under these circumstances, each time one of the optimization applications (e.g., the IVVC or OFR) executes, it will undo the changes made by the previous application based on its own objectives and constraints. In this situation, at best, each optimization application effectively cancels out the benefit of the other as the parameters in the electrical network oscillate with each iterative execution of the two applications. In the worst-case scenario, the changes made by each of the optimization applications may be in complete conflict, once again leaving the electrical network 10 and a permanent or semi-permanent abnormal state.

In contrast, the presently disclosed CDO system 30 enables the coordination of multiple optimization applications. That is, for the second example of conflict that forth above, the presently disclosed CDO system 30 may enable the two secondary optimization applications (e.g., OFR and IVVC) to cooperate when making changes to the parameters of the electrical network 10. By coordinating the actions of the two secondary optimization applications throughout the time horizon, losses may be reduced while still achieving the higher priority objectives (i.e., the objectives of the higher priority optimization application). Furthermore, the CDO system 30 may prevent the aforementioned parameter oscillation in the electrical network 10 as the two secondary optimization applications are executed.

Technical effects of the presently disclosed technique include enabling the coordinated operation of a number of different electrical network control and/or optimization applications to substantially improve the performance, efficiency, and reliability of the electrical network. More specifically, the presently disclosed coordinated distribution optimization (CDO) system may prioritize the execution of the various electrical network applications based on the relative importance of the underlying objective of each of the applications to the operation of the electrical network. Moreover, by considering the look-ahead capabilities and incorporating all of the available controls of each electrical network application, the presently disclosed CDO method and system enables the various applications to effectively collaborate in controlling and/or optimizing the electrical network. Furthermore, by ensuring that the adjustments recommended by higher priority electrical network applications take precedence, the presently disclosed CDO system may generally provide global optimization of the parameters of the electrical network across the entire operation look-ahead horizon. That is, by avoiding conflict between the various electrical network control applications, the parameters of the electrical network may be properly managed to block the electrical network from entering abnormal states.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  a controller that is configured to adjust parameters of an electrical network;
  a processor; and
  a memory including:
    a control application that, when executed by the processor, causes the processor to determine at least one operational parameter adjustment;
    a plurality of optimization applications that, when executed by the processor, cause the processor to determine at least one optimization parameter adjustment, wherein each of the plurality of optimization applications is assigned to one of a plurality of execution priorities;
    instructions that, when executed by the processor, cause the processor to perform operations comprising:
      selecting a first optimization application from the plurality of optimization applications based on the plurality of execution priorities, wherein the first optimization application is assigned a first priority of the plurality of execution priorities, wherein the first priority is a highest priority of the plurality of execution priorities;
      executing, if the control application is not running, the first optimization application of the plurality of optimization applications to determine at least one first optimization parameter adjustment;
      validating the at least one first optimization parameter adjustment has been applied to the electrical network by the controller;
      selecting, a second optimization application of the plurality of optimization applications, wherein the second optimization application is selected from the plurality of optimization applications based on the plurality of execution priorities, the second optimization application is assigned a second priority of the plurality of execution priorities, and the second priority is lower than the first priority of the plurality of execution priorities; and
      executing, if the control application is not running and after the at least one first optimization parameter adjustment has been applied to the electrical network by the controller, the second optimization application of the plurality of optimization applications to determine at least one second optimization parameter adjustment.

2. The system of claim 1, further comprising a network interface configured to receive electrical network operational data from the controller.

3. The system of claim 1, wherein the control application includes
  a fault detection, isolation, and service restoration (FDIR) application.

4. The system of claim 1, wherein each of the plurality of execution priorities is based, at least in part, on at least one objective.

5. The system of claim 4, wherein the at least one objective is selected from the group consisting of:
  maximizing a number of customers having power;
  minimizing a number of switch operations;
  minimizing feeder power loss;
  optimizing feeder load balancing;
  optimizing feeder phase load balancing;
  enhancing feeder voltage profiles;
  maximizing feeder power factor; and
  minimizing feeder power consumption.

6. The system of claim 3, wherein the first optimization application of the plurality of optimization applications is one of:
  a Volt/Volt-ampere reactive control (IVVC) application;
  an optimal feeder reconfiguration (OFR) application;
  a demand-response management (DRM) application; and
  a distributed energy resources management (DERM) application.

7. The system of claim 6, wherein the second optimization application of the plurality of optimization applications is one of:
  a Volt/Volt-ampere reactive control (IVVC) application;
  an optimal feeder reconfiguration (OFR) application;
  a demand-response management (DRM) application; and a distributed energy resources management (DERM) application.

8. The system of claim 7, wherein the second optimization application is OFR.

9. The system of claim 1, wherein the at least one optimization parameter adjustment is determined based on at least one of an objective and power grid operational data.

10. The system of claim 1, wherein the electrical network is a power grid.

11. The system of claim 1, comprising instructions that, when executed by the processor, cause the processor to perform operations comprising delivering the at least one first optimization parameter adjustment to the controller to be automatically applied to the electrical network.

12. The system of claim 1, wherein validating the at least one first optimization parameter adjustment has been applied to the electrical network by the controller includes comparing a predicted effect of an application of the at least one first optimization parameter adjustment to current conditions of the electrical network.

13. The system of claim 12, wherein if the predicted effect of the application of the at least one first optimization parameter adjustment is inconsistent with the current conditions of the electrical network, the first optimization application is re-executed.

14. The system of claim 1, wherein the at least one first optimization parameter adjustment is determined in order to minimize or maximize a parameter of the electrical network.

15. The system of claim 1, wherein the at least one first optimization parameter adjustment is determined in order to minimize power losses within a feeder.

16. The system of claim 1, wherein the at least one first optimization parameter adjustment is determined in order to maximize energy efficiency.

17. The system of claim 1, comprising instructions that, when executed by the processor, cause the processor to perform operations comprising:
   validating the at least one second optimization parameter adjustment has been applied to the electrical network by the controller;
   selecting, a third optimization application of the plurality of optimization applications, wherein the third optimization application is selected from the plurality of optimization applications based on the plurality of execution priorities, the third optimization application is assigned a third priority of the plurality of execution priorities, and the third priority is lower than the second priority; and
   executing, if the control application is not running and after the at least one second optimization parameter adjustment has been applied to the electrical network by the controller, the third optimization application of the plurality of optimization applications to determine at least one third optimization parameter adjustment.

18. The system of claim 1, wherein the controller is communicatively coupled to electrical components of the electrical network.

19. The system of claim 1, wherein the control application includes a plurality of control applications.

20. The system of claim 1, wherein the electrical network includes a plurality of electrical components configured to produce, convert, and transmit electrical power throughout the electrical network.

* * * * *